United States Patent

Fujimoto et al.

(10) Patent No.: US 8,088,874 B2
(45) Date of Patent: Jan. 3, 2012

(54) CROSSLINKED (METH)ACRYLIC ACID COPOLYMER AND SECONDARY-CELL ELECTRODE EMPLOYING THE SAME

(75) Inventors: Nobutaka Fujimoto, Himeji (JP); Koji Ueda, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 350 days.

(21) Appl. No.: 12/309,437

(22) PCT Filed: Jun. 4, 2007

(86) PCT No.: PCT/JP2007/061311
§ 371 (c)(1),
(2), (4) Date: Mar. 12, 2009

(87) PCT Pub. No.: WO2008/010356
PCT Pub. Date: Jan. 24, 2008

(65) Prior Publication Data
US 2009/0306304 A1    Dec. 10, 2009

(30) Foreign Application Priority Data

Jul. 19, 2006 (JP) ................... 2006-197290
Sep. 1, 2006 (JP) ................... 2006-237785

(51) Int. Cl.
*C08F 26/06* (2006.01)
(52) U.S. Cl. .................. 526/265; 526/258; 526/260
(58) Field of Classification Search .................. 526/260, 526/258, 265
See application file for complete search history.

(56) References Cited

U.S. PATENT DOCUMENTS

| 2004/0115529 A1 | 6/2004 | Nakahara et al. |
| 2008/0319149 A1 | 12/2008 | Fujimoto et al. |

FOREIGN PATENT DOCUMENTS

| CN | 1500293 | 5/2004 |
| EP | 1 381 100 | 1/2004 |
| EP | 1 752 474 | 2/2007 |
| EP | 1 911 775 | 4/2008 |
| JP | 2001-83672 | 3/2001 |
| JP | 2001-210314 | 8/2001 |
| JP | 2002-304996 | 10/2002 |
| WO | 2005/116092 | 12/2005 |

OTHER PUBLICATIONS

Supplementary European Search Report issued in corresponding European Application No, 07744670.6, mailed Oct. 28, 2009—8 pages.
Database WPI Week 200136 Thomson Scientific, London, GB; AN 2001-338379 XP002549980 & JP 2001 083672 A (Fuji Photo Film Co Ltd) 30 Mar. 2001—Abstract.
Database WPI Week 20028 Thomson Scientific, London, GB; AN 2002-057690 XP 002549981 & JP 2001 210314 A (Asahi Denka Kogyo KK) 3 Aug. 2001—Abstract.
Sébastien Queste, Primary Examiner, European Office Action issued in corresponding European Application No. 07744670.6 and mailed Mar. 17, 2010—5 pages.

*Primary Examiner* — Edward Cain
(74) *Attorney, Agent, or Firm* — Hamre, Schumann, Mueller & Larson, P.C.

(57) ABSTRACT

It is an object of the present invention to provide a crosslinked (meth)acrylic acid-type copolymer excellent in stability to a solvent, which causes substantially no crack due to drying when applied onto the surface of a current collector, and a secondary-cell electrode using the copolymer.

The present invention relates to a crosslinked (meth)acrylic acid-type copolymer obtained by the steps of: polymerization of a (meth)acrylic acid imino compound represented by the general formula (1):

[Chem. 1]

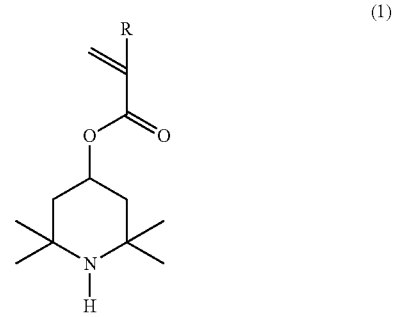

(1)

(in the formula (1), R represents a hydrogen atom or a methyl group) and a (meth)acrylic acid ester in the presence of a crosslinking agent, and nitroxidation.

8 Claims, No Drawings

CROSSLINKED (METH)ACRYLIC ACID COPOLYMER AND SECONDARY-CELL ELECTRODE EMPLOYING THE SAME

TECHNICAL FIELD

The present invention relates to a crosslinked (meth)acrylic acid-type copolymer and a secondary-cell electrode using the copolymer. More specifically, the present invention relates to a crosslinked (meth)acrylic acid-type copolymer which is used as an electrode material of a secondary cell high in energy density and in capacity, and a secondary-cell electrode using the copolymer.

BACKGROUND ART

With the rapid market expansion in the fields of laptop computers and cellular phones, there has been a growing demand for small-sized, high-energy-density and high-capacity secondary cells for use in such machines or instruments. To meet such demand, secondary cells which utilize an electrochemical reaction associated with a charge transfer, with alkali metal ions such as lithium ions serving as charge carriers, have been developed. In particular, lithium ion secondary cells are utilized as high-capacity secondary cells high in energy density and excellent in stability in various electronic machines and instruments. In such lithium ion secondary cells, a lithium-containing transition metal oxide is generally used as an active material in a positive electrode, and carbon as an active material in a negative electrode, and charging and discharging are carried out by utilizing insertion and elimination reactions of lithium ions into and from these active materials.

In recent years, a secondary cell in which a radical compound is utilized as an electrode active material directly contributing to an electrode reaction have been proposed for further capacity increases (see Patent Document 1).

In the secondary cell, as a solvent of an electrolyte in which charge carriers move between the negative electrode and the positive electrode, organic solvents such as ethylene carbonate, propylene carbonate, dimethyl carbonate, diethyl carbonate, ethyl methyl carbonate, γ-butyrolactone, tetrahydrofuran, dioxofuran, sulfolane, dimethylformamide, dimethylacetoamide, and N-methyl-2-pyrrolidone are used. Each of these organic solvents can be used alone, or two or more of these can be used in combination. Furthermore, as the radical compound, polymers having a stable radical in their side chain such as poly(2,2,6,6-tetramethyl-4-piperidinoxy methacrylate), poly(2,2,5,5-tetramethyl-2-pyrrolidinoxy methacrylate), and poly(2,2,5,5-tetramethyl-2-pyrrolinoxy methacrylate) are used.

In accordance with these conventionally-proposed radical compounds, however, performance stability of the secondary cells is insufficient because stability to a solvent is insufficient and the electrode active material is dissolved by the solvent of the electrolyte.

Thus, the inventors of the present invention made researches for solving the above problems and found a method for producing a radical compound excellent in stability to a solvent. As a result, the inventors filed the patent application relating to a method for producing a crosslinked poly(meth)acrylic acid nitroxide compound, comprising the step of polymerizing a predetermined (meth)acrylic acid compound in the presence of a crosslinking agent and a method for producing a secondary-cell electrode using the compound (see Patent Document 2).

Patent Document 1: Japanese Kokai Publication 2002-304996
Patent Document 2: WO2005/116092

DISCLOSURE OF THE INVENTION

Problems to be Solved by the Invention

The crosslinked poly(meth)acrylic acid nitroxide compound disclosed in Patent Document 2 has excellent stability to a solvent and stability of secondary cells can be improved by using the compound; however, it requires a relatively much amount of a solvent to make the compound into a coating composition and to apply it to a current collector, and in some cases cracks occur on the composition-applied surface of the current collector after being dried. When cracks occur, processability of the electrode upon production of secondary cells may become poor and/or capacity of secondary cells using the electrode may be lowered.

It is an object of the present invention to provide a crosslinked (meth)acrylic acid-type copolymer excellent in stability to a solvent, which causes substantially no crack due to drying when applied onto the surface of a current collector, and a secondary-cell electrode using the copolymer.

Means for Solving the Problems

The present inventors have eagerly made further examination on the crosslinked poly(meth)acrylic acid nitroxide compound in Patent Document 2 and have found a crosslinked (meth)acrylic acid-type copolymer having more excellent properties and thus, the present invention has been completed.

The present invention relates to a crosslinked (meth)acrylic acid-type copolymer obtained by the steps of: polymerization of a (meth)acrylic acid imino compound represented by the general formula (I):

[Chem. 1]

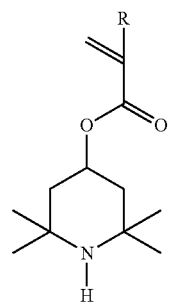

(1)

(in the formula (I), R represents a hydrogen atom or a methyl group) and a (meth)acrylic acid ester in the presence of a crosslinking agent, and nitroxidation.

The present invention also relates to a secondary-cell electrode using the above crosslinked (meth)acrylic acid-type copolymer.

In the present invention, acrylic acid and methacrylic acid are referred to as (meth)acrylic acid, and acrylate and methacrylate are referred to as (meth)acrylate. The detailed description of the present invention will be given hereinafter.

The crosslinked (meth)acrylic acid-type copolymer of the present invention is obtained by the steps of: polymerization of a (meth)acrylic acid imino compound represented by the general formula (I) and a (meth)acrylic acid ester in the presence of a crosslinking agent, and nitroxidation.

[Chem. 2]

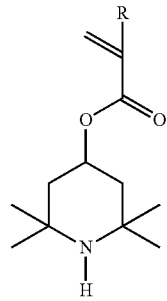

(1)

In the formula (I), R represents a hydrogen atom or a methyl group.

Specific examples of the (meth)acrylic acid imino compound represented by the general formula (I) include 2,2,6,6-tetramethyl-4-piperidinyl(meth)acrylate, and so on, and commercial products can be used.

Since the (meth)acrylic acid ester is used, the crosslinked (meth)acrylic acid-type copolymer of the present invention makes it possible to realize a high coating property with a relatively low amount of a solvent upon making the copolymer into a coating composition, thereby preventing cracks upon being dried, while retaining a property of preventing elution of the copolymer to a solvent of an electrolyte (stability to a solvent). Although it is not clear why these effects can be exerted, this may be because that it becomes easier for the solvent to enter spaces between the molecular chains due to repulsion of the introduced alkyl groups and flowability of a slurry is improved compared to that before introduction of the alkyl groups.

The (meth)acrylic acid ester used for obtaining the crosslinked (meth)acrylic acid-type copolymer of the present invention is not particularly limited. Examples thereof include (meth)acrylic acid alkyl esters, polyalkylene glycol mono(meth)acrylates, and so on. The (meth)acrylic acid alkyl esters are not particularly limited. Examples thereof include methyl(meth)acrylate, ethyl(meth)acrylate, propyl(meth)acrylate, isopropyl (meth)acrylate, butyl(meth)acrylate, hexyl(meth)acrylate, octyl(meth)acrylate, decyl(meth)acrylate, lauryl (meth)acrylate, stearyl(meth)acrylate, behenyl (meth)acrylate, and so on. The polyalkylene glycol mono(meth)acrylates are not particularly limited. Examples thereof include polyethylene glycol mono(meth)acrylate, polypropylene glycol mono(meth)acrylate, and so on. With respect to the size of a polyalkylene glycol part, for example, the polyalkylene glycol part may have 1 to 100 repeating units of the alkylene glycol part. The (meth)acrylic acid alkyl esters are suitably used among these due to their excellent coating property upon making a crosslinked (meth)acrylic acid-type copolymer to be obtained into a coating composition. Suitably used among these are hexyl(meth)acrylate, octyl(meth)acrylate, decyl (meth)acrylate, lauryl(meth)acrylate, stearyl (meth)acrylate, and behenyl(meth)acrylate, in particular, stearyl(meth)acrylate is suitably used. Each of these (meth)acrylic acid esters can be used alone, or two or more of these can be used in combination.

For obtaining a good coating surface of the crosslinked (meth)acrylic acid-type copolymer and exerting effects consistent with the amount used, the amount used of the (meth)acrylic acid ester is preferably 0.00001 to 0.25 mol, more preferably 0.00005 to 0.10 mol, and still more preferably 0.001 to 0.05 mol, per 1 mol of the (meth)acrylic acid imino compound.

The crosslinking agent used for obtaining the crosslinked (meth)acrylic acid-type copolymer of the present invention is not particularly limited as long as the agent is a compound containing a plurality of polymerizable unsaturated groups in a molecule. Examples thereof include polyfunctional (meth)acrylic acid-type compounds, polyfunctional allyl ether-type compounds, polyfunctional vinyl-type compounds, and so on. Examples of the polyfunctional (meth)acrylic acid-type compounds include ethylene glycol di(meth)acrylate, diethylene glycol di(meth)acrylate, polyethylene glycol di(meth)acrylate, 1,3-propanediol di(meth)acrylate, 1,3-butanediol di(meth)acrylate, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, trimethylolpropane tri(meth)acrylate, glycerol di(meth)acrylate, 2-hydroxy-3-(meth)acryloyloxypropyl (meth)acrylate, and so on. Examples of the polyfunctional allyl ether-type compounds include diethylene glycol diallyl ether, dibutylene glycol diallyl ether, and so on. Examples of the polyfunctional vinyl-type compounds include divinylbenzene and so on. From the viewpoint of its high polymerization reactivity, the polyfunctional (meth)acrylic acid-type compounds are suitably used among these and, in particular, ethylene glycol di(meth)acrylate, 1,4-butanediol di(meth)acrylate, 1,6-hexanediol di(meth)acrylate, 1,8-octanediol di(meth)acrylate, and 1,9-nonanediol di(meth)acrylate are suitably used. Each of these crosslinking agents can be used alone, or two or more of these can be used in combination.

For obtaining the crosslinked (meth)acrylic acid-type copolymer with excellent stability to a solvent and exerting effects consistent with the amount used, the amount used of the crosslinking agent is preferably 0.00001 to 0.25 mol, more preferably 0.00005 to 0.1 mol, and still more preferably 0.0001 to 0.05 mol, per 1 mol of the (meth)acrylic acid imino compound.

In the present invention, a method for polymerization of the (meth)acrylic acid imino compound and the (meth)acrylic acid ester in the presence of the crosslinking agent is not particularly limited. Examples thereof include a suspension polymerization method, an emulsion polymerization method, a solution polymerization method, and so on.

With respect to the suspension polymerization method, for example, there is included a method in which a surfactant and a mixture containing the (meth)acrylic acid imino compound, the (meth)acrylic acid ester, the crosslinking agent, and an oil-soluble radical polymerization initiator, each having a predetermined amount, in an inert hydrocarbon-type solvent are mixed with water, which is inert to reaction, to be dispersed therein, and then the resulting mixture is deoxidized by nitrogen gas, followed by being heated under agitation by using a reactor provided with an agitator, a thermometer, a nitrogen-gas introducing tube, and a condenser tube.

The oil-soluble radical polymerization initiator used in the suspension polymerization method is not particularly limited. Examples thereof include: peroxide-type polymerization initiators such as benzoyl peroxide, tert-butyl peroxide, lauroyl peroxide, diisopropyl peroxydicarbonate, and dicyclohexyl peroxydicarbonate; azo-type polymerization initiators such as α,α'-azobisisobutyronitrile, 2,2'-azobis-2,4-dimethylvaleronitrile, and dimethyl 2,2'-azobisisobutyrate; redox-type polymerization initiators such as benzoyl peroxide/dimethylaniline, di-tert-butyl peroxide/dimethylaniline, and lauroyl peroxide/dimethylaniline; and so on. The azo-type polymerization initiators such as α,α'-azobisisobutyronitrile are suitably used among these due to its inexpensiveness and easy handleability.

Although the amount of the oil-soluble radical polymerization initiator used in the suspension polymerization method depends on the kind and the reaction temperature of the oil-soluble radical polymerization initiator to be used, the amount thereof is generally 0.005 to 5 parts by weight per 100 parts by weight of the (meth)acrylic acid imino compound.

The inert hydrocarbon-type solvent used in the suspension polymerization method is not particularly limited. Examples thereof include: aromatic hydrocarbon-type solvents such as benzene, toluene, and xylene; acyclic saturated hydrocarbon-type solvents such as n-hexane, n-heptane, and ligroin; cyclic saturated hydrocarbon-type solvents such as cyclopentane, methylcyclopentane, cyclohexane and methylcyclohexane; halogenated hydrocarbon-type solvents such as dichloromethane, chloroform, and dichloroethane; and so on. From the viewpoints of easy industrial availability, inexpensiveness, and stable quality of a polymerization reaction product to be obtained, the aromatic hydrocarbon-type solvents and the acyclic saturated hydrocarbon-type solvents are preferable among these and, in particular, toluene and n-hexane are suitably used.

For sufficiently dissolving the (meth)acrylic acid imino compound into a solvent to allow the polymerization reaction to smoothly advance and exerting effects consistent with the amount used, the amount of the inert hydrocarbon-type solvent used in the suspension polymerization method is preferably 50 to 300 parts by weight, and more preferably 100 to 200 parts by weight, per 100 parts by weight of the (meth)acrylic acid imino compound.

With respect to the surfactant used in the suspension polymerization method, any of anionic surfactants, cationic surfactants, nonionic surfactants and amphoteric surfactants can be used.

Examples of the anionic surfactants used in the suspension polymerization method include fatty acid sodium salts, fatty acid potassium salts, sodium alkyl sulfates, sodium alkylbenzene sulfonates, sodium alkane sulfonates, sodium alkyl phosphates, acyloyl methyl taurates, sodium N-methyl-N-acylamido propionates, sodium monoalkyl biphenyl ether disulfonates, sodium naphthalene sulfonate-formalin condensates, sodium acyl glutamates, sodium polyoxyethylene alkylphenyl ether alkylbenzene sulfonates, sodium polyoxyethylene alkyl ether sulfates, sodium polyoxyethylene alkyl ether methyl carbonates, sodium polyoxyethylene alkyl ether ethane sulfonates, and so on.

Examples of the cationic surfactants used in the suspension polymerization method include monoalkyl trimethyl ammonium methosulfates, cationized celluloses, alkyl trimethyl ammonium chlorides, distearyl dimethyl ammonium chlorides, dialkyl dimethyl ammonium chlorides, dialkyl dimethylbenzyl ammonium chlorides, alkylpyridinium chlorides, and so on.

Examples of the nonionic surfactants used in the suspension polymerization method include fatty acid monoglycerides, sorbitan fatty acid partial esters, polyoxyethylene alkyl ethers, polyoxyethylene alkyl phenyl ethers, polyoxyethylene fatty acid monoglycerides, polyoxyethylene sorbitol fatty acid partial esters, polyoxyethylene sorbitan fatty acid partial esters, polyoxyethylene lanoline alcohol ethers, polyethylene glycol fatty acid monoesters, polyethylene glycol fatty acid diesters, polyoxyethylene fatty acid amines, polyglycerin fatty acid partial esters, bis(2-hydroxyethyl)alkyl amines, alkyl dimethyl amine oxides, fatty acid alkylol amides, ω-methoxypolyoxyethylene-α-alkyl ethers, polyoxyethylene polyoxypropylene block copolymers, polyoxyethylene polyoxypropylene alkyl ethers, polyoxyethylene acetylene glycols, sugar fatty acid partial esters, polyvinyl alcohols, partially saponified polyvinyl alcohols, and so on.

Examples of the amphoteric surfactants used in the suspension polymerization method include N-acylamidopropyl-N,N-dimethyl ammoniobetaines, N-acylamidopropyl-N',N'-dimethyl-N'-β-hydroxypropyl ammoniosulfobetaines, N-acylamidoethyl-N'-hydroxyethyl-N'-carboxymethyl ammoniobetaines, N-alkyl-N-dimethyl-N-carboxymethyl ammoniobetaines, alkyl diaminoethyl glycines, acylated polypeptides, and so on.

From the viewpoints of easy industrial availability, inexpensiveness, and stable quality of a polymerization reaction product to be obtained, sodium alkylbenzene sulfonates, sodium polyoxyethylene alkylphenyl ether alkylbenzene sulfonates, polyvinyl alcohols, and partially saponified polyvinyl alcohols are suitably used among these surfactants. Sodium dodecylbenzene sulfonate is preferable among the sodium alkylbenzene sulfonates, and sodium polyoxyethylene nonylphenyl ether dodecylbenzene sulfonate is preferable among the sodium polyoxyethylene alkylphenyl ether alkylbenzene sulfonates.

For allowing the reaction to smoothly advance and exerting effects consistent with the amount used, the amount of the surfactant used in the suspension polymerization method is preferably 0.05 to 10 parts by weight, and more preferably 0.1 to 5 parts by weight, per 100 parts by weight of the water.

Further, for sufficiently removing the heat of polymerization and easily controlling the polymerization temperature, the amount of the water used in the suspension polymerization method is preferably 200 to 3000 parts by weight, and more preferably 300 to 2000 parts by weight, per 100 parts by weight of the (meth)acrylic acid imino compound.

If necessary, additives such as a chain transfer agent (for example, isopropyl alcohol) and a polymerization terminator (for example, methanol) may be appropriately added in the suspension polymerization reaction.

The reaction temperature in the suspension polymerization method is preferably 30 to 100° C., and more preferably 40 to 80° C. The reaction time period depends on the reaction temperature, but is generally 0.5 to 10 hours.

Since the polymerization reaction product thus obtained exists in a state of particles in the reaction solvent, it is possible to isolate the product by filtrating the reaction liquid. Moreover, it is possible to refine the product by removing unreacted materials and so on, washing the product by using water, methanol, hexane and so on, and then drying the product.

With respect to the emulsion polymerization method, which is another polymerization method for obtaining the crosslinked (meth)acrylic acid-type copolymer of the present invention, for example, there is included a method in which the (meth) acrylic acid imino compound, the (meth)acrylic acid ester, the crosslinking agent, and the surfactant, each having a predetermined amount, are mixed with water, which is an inert solvent, to be dispersed therein, and then deoxidized by nitrogen gas, followed by adding a water-soluble radical polymerization initiator, and then heated under agitation by using a reactor provided with an agitator, a thermometer, a nitrogen-gas introducing tube, and a condenser tube.

The water-soluble radical polymerization initiator used in the emulsion polymerization method is not particularly limited. Examples thereof include: peroxide-type polymerization initiators such as ammonium persulfate, sodium persulfate, and potassium persulfate; and redox-type polymerization initiators such as ammonium ferrous sulfate/ammonium persulfate, and ethanol amine/potassium persulfate; and so on. The peroxide-type polymerization initiators such as potassium persulfate are suitably used among these due to its inexpensiveness and easy handleability.

Further, with respect to the kind and amount used of the surfactant, the amount used of the polymerization initiator, the amount used of the water as the inert solvent, the reaction temperature and reaction time period in the emulsion polymerization method, those in the suspension polymerization method can be applied thereto.

In the emulsion polymerization method, the inert hydrocarbon-type solvent similar to that used in the suspension polymerization method may be appropriately added so as to dissolve the (meth)acrylic acid imino compound into the solvent. If necessary, additives such as a chain transfer agent (for example, isopropyl alcohol) and a polymerization terminator (for example, methanol) may also be appropriately added.

The polymerization reaction product thus obtained can be isolated, for example, by mixing the reaction liquid with a large amount of cold water and precipitating the polymerization reaction product therein, and then filtrating the mixture. Moreover, it is possible to refine the product by removing unreacted materials and so on, washing the product by using water, hexane, methanol, and so on, and then drying the product.

With respect to the solution polymerization method, which is still another polymerization method for obtaining the crosslinked (meth)acrylic acid-type copolymer of the present invention, for example, there is included a method in which the (meth)acrylic acid imino compound, the (meth)acrylic acid ester, the crosslinking agent, and the inert solvent, each having a predetermined amount, are put into a reactor provided with an agitator, a thermometer, a nitrogen-gas introducing tube, and a condenser tube, and then deoxidized by nitrogen gas, followed by adding the polymerization initiator under agitation.

Examples of the inert solvent used in the solution polymerization method include: aromatic hydrocarbon-type solvents such as benzene, toluene, and xylene; acyclic saturated hydrocarbon-type solvents such as n-hexane, n-heptane, and ligroin; cyclic saturated hydrocarbon-type solvents such as cyclopentane, methylcyclopentane, cyclohexane and methylcyclohexane; ether-type solvents such as diethyl ether, and tetrahydrofuran; and so on.

For allowing the reaction to smoothly advance and exerting effects consistent with the amount used, the amount of the inert solvent used in the solution polymerization method is preferably 50 to 2000 parts by weight per 100 parts by weight of the (meth)acrylic acid imino compound.

The polymerization initiator used in the solution polymerization method is not particularly limited, and polymerization can be carried out by using a radical polymerization initiator, an anionic-type polymerization initiator, and so on. Examples of the radical polymerization initiator include: peroxide-type polymerization initiators such as benzoyl peroxide, lauroyl peroxide, cumene hydroperoxide, tert-butyl hydroperoxide, and potassium persulfate; azo-type polymerization initiators such as $\alpha,\alpha'$-azobisisobutyronitrile, 2,2'-azobis-2,4-dimethylvaleronitrile, and dimethyl 2,2'-azobisisobutyrate; redox-type polymerization initiators such as ammonium ferrous sulfate/ammonium persulfate, ethanol amine/potassium persulfate, and sodium bromate/sulfur dioxide; and so on. The azo-type polymerization initiators such as $\alpha,\alpha'$-azobisisobutyronitrile are suitably used among these due to its inexpensiveness and easy handleability. Examples of the anionic-type polymerization initiator include Grignard reagents (such as n-butyl magnesium bromide, isobutyl magnesium bromide, tert-butyl magnesium bromide, n-butyl magnesium chloride, isobutyl magnesium chloride, and tert-butyl magnesium chloride), alkyl lithium (such as n-butyl lithium, tert-butyl lithium, and 1,1-diphenylhexyl lithium), and so on. From the viewpoint of stable quality of a polymerization reaction product to be obtained, the alkyl lithium such as tert-butyl lithium is suitably used among these.

Although the amount of the polymerization initiator used in the solution polymerization method depends on the kind and the reaction temperature of the polymerization initiator to be used, the amount thereof is generally 0.005 to 5 parts by weight per 100 parts by weight of the (meth)acrylic acid imino compound.

If necessary, additives such as a chain transfer agent (for example, isopropyl alcohol) and a polymerization terminator (for example, methanol) may be appropriately added in the solution polymerization reaction.

The reaction temperature in the solution polymerization method depends on the kind of the polymerization initiator to be used, but in generally, the reaction temperature is preferably $-100$ to $100°$ C., and more preferably $-50$ to $80°$ C. It is impossible to unconditionally determine the reaction time period because the reaction time period depends on the reaction temperature, but it is generally 2 to 10 hours.

The polymerization reaction product thus obtained can be isolated, for example, by mixing the reaction liquid with an aliphatic hydrocarbon solvent such as hexane, and so on, and precipitating the polymerization reaction product therein, and then filtrating the mixture. Moreover, it is possible to refine the product by removing unreacted materials and so on, washing the product by using hexane, methanol, and so on, and then drying the product.

The crosslinked (meth)acrylic acid-type copolymer of the present invention can be produced by nitroxidation of the above polymerization reaction product.

A method for nitroxidation of the polymerization reaction product is not particularly limited. Examples thereof include a commonly known method in which secondary amine with steric hindrance is oxidized by using an oxidant to produce a compound having a corresponding nitroxide free radical. Specifically, for example, it is possible to nitroxidize the polymerization reaction product by mixing the polymerization reaction product with an inert solvent, and then adding the oxidant thereto under agitation to allow them to react with each other.

Examples of the inert solvent used in the nitroxidation include: halogenated hydrocarbons such as dichloromethane, chloroform, and dichloroethane; aliphatic nitriles such as acetonitrile, propionitrile, and butylonitrile; aromatic nitriles such as benzonitrile, and tolunitrile; alcohols such as methanol, ethanol, n-propanol, iso-propanol, n-butanol, sec-butanol, iso-butanol, and tert-butanol; aromatic hydrocarbons such as benzene, toluene, and xylene; water; and so on. The halogenated hydrocarbons such as dichloromethane, chloroform, and dichloroethane and the alcohols such as methanol, ethanol, and tert-butanol are suitably used among these.

For allowing the reaction to smoothly advance and exerting effects consistent with the amount used, the amount of the inert solvent used in the nitroxidation is preferably 50 to 5000 parts by weight, and more preferably 100 to 3000 parts by weight, per 100 parts by weight of the polymerization reaction product.

Examples of the oxidant used in the nitroxidation include: peroxides such as hydrogen peroxide, performic acid, peracetic acid, perbenzoic acid, and perphthalic acid; halogenides of these peroxides; oxides such as silver oxide, lead tetraacetate, potassium hexacyanoferrate (III), and potassium permanganate; air; and so on.

For allowing the reaction to smoothly advance and exerting effects consistent with the amount used, the amount of the oxidant used in the nitroxidation is preferably 1 to 100 mol, and more preferably 1.5 to 50 mol, per 1 mol of the (meth) acrylic acid imino compound used in the production of the polymerization reaction product.

If necessary, a catalyst can be used in the nitroxidation reaction. With respect to the catalyst, catalysts generally used in a nitroxidation reaction can be used.

Specific examples of the catalyst used in the nitroxidation reaction include compounds containing a metal element selected from the sixth group in the 18-group periodic table such as tungsten and molybdenum. Examples thereof include: tungsten compounds such as tungstic acid, phosphotungstic acid, paratungstic acid, alkali metal salts (such as sodium salts and potassium salts) and ammonium salts thereof, tungsten oxide, and tungsten carbonyl; molybdenum compounds such as molybdic acid, phosphomolybdic acid, paramolybdic acid, alkali metal salts (such as sodium salts and potassium salts) and ammonium salts thereof, molybdenum oxide, and molybdenum carbonyl; and so on. More specifically, examples thereof include ammonium paratungstate, sodium tungstate, phosphotungstic acid, sodium molybdate, molybdenum trioxide, molybdenum hexacarbonyl, and so on.

For allowing the reaction to smoothly advance and exerting effects consistent with the amount used, the amount of the catalyst used in the nitroxidation is preferably 0.001 to 20 parts by weight, and more preferably 0.01 to 10 parts by weight, per 100 parts by weight of the polymerization reaction product.

The reaction temperature of the nitroxidation is preferably 0 to 100° C., and more preferably 20 to 80° C.

With respect to a procedure in the method for nitroxidation of the polymerization reaction product, since the reaction is allowed to easily advance in good yield, it is preferable to firstly mix the polymerization reaction product and the inert solvent, if necessary also mixing the catalyst, and then react the mixture while adding the oxidant thereto.

The time period for reacting the mixture while adding the oxidant is not particularly limited, but is generally 1 to 10 hours, and preferably 3 to 6 hours. Further, after finishing the addition of the oxidant, the temperature is generally maintained in the above temperature for 1 to 10 hours to finish the reaction.

The crosslinked (meth)acrylic acid-type copolymer of the present invention thus obtained can be isolated from the reaction liquid by carrying out filtration, drying, and so on in combination. In the nitroxidation reaction, the polymerization reaction product is not necessarily dissolved in the inert solvent and the nitroxidation reaction can easily advance even when the product is in, for example, a swelling state.

A secondary-cell electrode can be produced by binding the crosslinked (meth)acrylic acid-type copolymer of the present invention and a current collector.

The current collector is a component of the electrode where electric charges generated from the secondary-cell electrode are collected, and comprises an electric conductor. Examples of a material of the current collector generally include metal foils, metal plates and metal meshes of nickel, aluminum, copper, gold, silver, aluminum alloy, stainless steel and so on, carbon rods, and so on.

Examples of a method for producing the secondary-cell electrode of the present invention include a method which comprises the steps of preparing a coating composition by making the crosslinked (meth)acrylic acid-type copolymer into the coating composition and applying the coating composition to the current collector. The preparing method and the applying method are not particularly limited and commonly known methods and apparatuses can be used.

Examples of the method for preparing the coating composition include a method in which the crosslinked (meth) acrylic acid-type copolymer is mixed with a binder and then a solvent is added thereto to form a slurry. Specific examples of the binder include resin binders such as polyvinylidene fluoride, vinylidene fluoride-hexafluoro propylene copolymers, vinylidene fluoride-tetrafluoro ethylene copolymers, styrene-butadiene copolymer rubbers, polypropylene, polyethylene, polyimide, various kinds of polyurethanes, and so on. Specific examples of the solvent include dimethyl formamide, N-methylpyrrolidone, and so on.

Examples of the method for applying the coating composition include a method in which the slurry obtained by the method for preparing the coating composition is dropped onto the surface of the current collector and spread with a wire bar so that the thickness of the coating composition becomes wholly even, and then the slurry is dried to remove the solvent.

Upon preparing the coating composition, an auxiliary conductive material and an ionic conduction aid may be appropriately added to the crosslinked (meth)acrylic acid-type copolymer in order to reduce impedance. Specific examples of the auxiliary conductive material include: carbonaceous particles such as graphite, carbon black, and acetylene black; conductive polymers such as polyaniline, polypyrrole, polythiophene, polyacetylene, and polyacene; and so on. Specific examples of the ionic conduction aid include polymeric gel electrolytes, polymeric solid electrolytes, and so on.

The thickness of a coating film formed by applying the coating composition prepared by the crosslinked (meth) acrylic acid-type copolymer is preferably 10 to 1000 μm, and more preferably 50 to 300 μm.

The secondary-cell electrode of the present invention can be suitably used as an electrode of a secondary cell high in energy density and capacity, such as a lithium ion secondary cell.

Effects of the Invention

The present invention provides a crosslinked (meth)acrylic acid-type copolymer not only excellent in stability to a solvent but also excellent in a coating property and causing substantially no crack due to drying when made into a coating composition. The present invention also provides a secondary-cell electrode using the copolymer.

BEST MODE FOR CARRYING OUT THE INVENTION

The specific description of the present invention will be given hereinbelow with examples, but the present invention is not limited to these examples.

Example 1

Into a 200 ml Erlenmeyer flask were put 22.50 g (100 mmol) of 2,2,6,6-tetramethyl-4-piperidinyl methacrylate, 0.30 g (1.0 mmol) of 1,9-nonanediol dimethacrylate, 0.34 g (1.0 mmol) of n-stearyl methacrylate, 0.34 g (1.4 mmol) of 2,2'-azobis-2,4-dimethylvaleronitrile as a polymerization initiator, and 26 ml of toluene, and then mixed to obtain a homogeneous solution.

Next, 200 ml of water and 3.0 g of partially saponified polyvinyl alcohol (degree of saponification: 87%, degree of polymerization: 2000) as a surfactant were mixed in a 500 ml four-neck flask provided with an agitator, a nitrogen-gas introducing tube, a thermometer, and a reflux condenser tube, and then the above homogeneous solution was added thereto to be dispersed under agitation while maintained at a temperature of 25° C. Subsequently, oxygen in the reaction system was removed by introducing nitrogen gas, and then the reaction was allowed to advance at a temperature of 60° C. for 6 hours under agitation. After the reaction was finished, the reaction liquid was cooled to room temperature and then filtrated. The filtrated liquid was washed with 500 ml of water and subsequently 500 ml of hexane, respectively, and then dried under reduced pressure, so that 23.1 g of a polymerization reaction product, which was a white powder, was obtained (99.8% yield).

H-NMR of the obtained polymerization reaction product in a white powder state was measured to be found that peaks were observed at 5.06, 3.92, 1.87, 1.23, 1.21, 1.17, 0.94, and 0.73 ppm. The peak at 3.92 ppm among these was due to n-stearyl methacrylate.

Next, 10 g of the polymerization reaction product obtained, 0.73 g (2.2 mmol) of sodium tungstate dihydrate as a catalyst, and 300 ml of methanol were put into a 500 ml four-neck flask provided with an agitator, a nitrogen-gas introducing tube, a thermometer, a reflux condenser tube, and a dropping funnel, and then oxygen in the reaction system was removed by introducing nitrogen gas while maintained at a temperature of 25° C. Thereafter, 50.40 g (445 mmol) of a 30% hydrogen peroxide solution was dropped thereto for 3 hours. Subsequently, the reaction liquid was maintained at a temperature of 25° C. for 8 hours, and then the reaction liquid was filtrated. The filtrated liquid was washed with 500 ml of methanol and subsequently 500 ml of water, respectively, and then dried under reduced pressure, so that 9.8 g of a crosslinked methacrylic acid-type copolymer, which was a red powder, was obtained.

Example 2

Into a 200 ml Erlenmeyer flask were put 22.50 g (100 mmol) of 2,2,6,6-tetramethyl-4-piperidinyl methacrylate, 0.30 g (1.0 mmol) of 1,9-nonanediol dimethacrylate, 0.34 g (1.0 mmol) of n-stearyl methacrylate, and 26 ml of toluene, and then mixed to obtain a homogeneous solution.

Next, 200 ml of water, 3.0 g of sodium dodecylbenzene sulfonate as a surfactant, and 0.38 g (1.4 mmol) of potassium persulfate as a polymerization initiator were mixed in a 500 ml four-neck flask provided with an agitator, a nitrogen-gas introducing tube, a thermometer, and a reflux condenser tube, and then the above homogeneous solution was added thereto to be dispersed under agitation while maintained at a temperature of 25° C. Subsequently, oxygen in the reaction system was removed by introducing nitrogen gas, and then the reaction was allowed to advance at a temperature of 60° C. for 6 hours under agitation. After the reaction was finished, the reaction liquid was cooled to room temperature and then filtrated. The filtrated liquid was washed with 500 ml of water and subsequently 500 ml of hexane, respectively, and then dried under reduced pressure, so that 22.5 g of a polymerization reaction product, which was a white powder, was obtained (97.1% yield).

H-NMR of the obtained polymerization reaction product in a white powder state was measured to be found that peaks were observed at 5.06, 3.92, 1.88, 1.23, 1.20, 1.17, 0.94, and 0.72 ppm. The peak at 3.92 ppm among these was due to n-stearyl methacrylate.

Next, 10 g of the polymerization reaction product obtained, 0.73 g (2.2 mmol) of sodium tungstate dihydrate as a catalyst, and 300 ml of methanol were put into a 500 ml four-neck flask provided with an agitator, a nitrogen-gas introducing tube, a thermometer, a reflux condenser tube, and a dropping funnel, and then oxygen in the reaction system was removed by introducing nitrogen gas while maintained at a temperature of 25° C. Thereafter, 50.40 g (445 mmol) of a 30% hydrogen peroxide solution was dropped thereto for 3 hours. Subsequently, the reaction liquid was maintained at a temperature of 25° C. for 8 hours, and then the reaction liquid was filtrated. The filtrated liquid was washed with 500 ml of methanol and subsequently 500 ml of water, respectively, and then dried under reduced pressure, so that 9.9 g of a crosslinked methacrylic acid-type copolymer, which was a red powder, was obtained.

Example 3

The same procedures as those in Example 1 were carried out except for using 3.29 g (11.1 mmol) of 1,9-nonanediol dimethacrylate instead of using 0.30 g (1.0 mmol) of the same, so that 24.5 g of a polymerization reaction product, which was a white powder, was obtained (93.8% yield).

H-NMR of the obtained polymerization reaction product in a white powder state was measured to be found that peaks were observed at 5.07, 3.91, 1.88, 1.24, 1.21, 1.17, 0.94, and 0.73 ppm. The peak at 3.91 ppm among these was due to n-stearyl methacrylate.

Next, the same procedures as those in Example 1 were carried out on the polymerization reaction product obtained, so that 9.6 g of a crosslinked methacrylic acid-type copolymer, which was a red powder, was obtained.

Example 4

The same procedures as those in Example 1 were carried out except for using 0.28 g (1.0 mmol) of 1,9-nonanediol diacrylate instead of using 0.30 g (1.0 mmol) of 1,9-nonanediol dimethacrylate, so that 22.4 g of a polymerization reaction product, which was a white powder, was obtained (96.9% yield).

H-NMR of the obtained polymerization reaction product in a white powder state was measured to be found that peaks were observed at 5.06, 3.91, 1.87, 1.22, 1.20, 1.16, 0.93, and 0.72 ppm. The peak at 3.91 ppm among these was due to n-stearyl methacrylate.

Next, the same procedures as those in Example 1 were carried out on the polymerization reaction product obtained, so that 9.8 g of a crosslinked methacrylic acid-type copolymer, which was a red powder, was obtained.

Example 5

The same procedures as those in Example 1 were carried out except for using 0.20 g (1.0 mmol) of ethylene glycol dimethacrylate instead of using 0.30 g (1.0 mmol) of 1,9-nonanediol dimethacrylate, so that 21.9 g of a polymerization reaction product, which was a white powder, was obtained (95.1% yield).

H-NMR of the obtained polymerization reaction product in a white powder state was measured to be found that peaks were observed at 5.07, 4.35, 3.92, 1.88, 1.25, 1.21, 1.18, 0.95, and 0.73 ppm. The peak at 4.35 ppm among these was due to ethylene glycol dimethacrylate and the peak at 3.92 ppm among these was due to n-stearyl methacrylate.

Next, the same procedures as those in Example 1 were carried out on the polymerization reaction product obtained, so that 9.9 g of a crosslinked methacrylic acid-type copolymer, which was a red powder, was obtained.

Example 6

The same procedures as those in Example 1 were carried out except for using 0.03 g (0.1 mmol) of n-stearyl methacrylate instead of using 0.34 g (1.0 mmol) of the same, so that 22.6 g of a polymerization reaction product, which was a white powder, was obtained (99.0% yield).

H-NMR of the obtained polymerization reaction product in a white powder state was measured to be found that peaks were observed at 5.06, 3.92, 1.87, 1.23, 1.20, 1.16, 0.93, and 0.72 ppm. The peak at 3.92 ppm among these was due to n-stearyl methacrylate.

Next, the same procedures as those in Example 1 were carried out on the polymerization reaction product obtained, so that 9.8 g of a crosslinked methacrylic acid-type copolymer, which was a red powder, was obtained.

Example 7

Into a 500 ml four-neck flask provided with an agitator, a nitrogen-gas introducing tube, a thermometer, and a reflux condenser tube were put 70.0 g (311 mmol) of 2,2,6,6-tetramethyl-4-piperidinyl methacrylate, 0.92 g (3.1 mmol) of 1,9-nonanediol dimethacrylate, 2.10 g (6.2 mmol) of n-stearyl methacrylate, and 150 ml of tetrahydrofuran to obtain a homogeneous solution. Subsequently, oxygen in the reaction system was removed by introducing nitrogen gas while maintained at a temperature of 25° C. Thereafter, 0.358 g (2.2 mmol) of α,α'-azobisisobutylonitrile as a polymerization initiator was added thereto, and then the reaction was allowed to advance at a temperature of 50° C. for 6 hours under agitation. After the reaction was finished, the reaction liquid was cooled to room temperature, and then added to 2000 ml of hexane to be filtrated. The filtrated liquid was washed with 500 ml of hexane, and then dried under reduced pressure, so that 70.4 g of a polymerization reaction product, which was a white powder, was obtained (97.5% yield).

H-NMR of the obtained polymerization reaction product in a white powder state was measured to be found that peaks were observed at 5.05, 3.92, 1.86, 1.22, 1.20, 1.16, 0.93, and 0.72 ppm. The peak at 3.92 ppm among these was due to n-stearyl methacrylate.

Next, 18 g of the polymerization reaction product obtained and 150 ml of dichloromethane were put into a 500 ml four-neck flask provided with an agitator, a nitrogen gas introducing tube, a thermometer, a reflux condenser tube, and a dropping funnel, and then oxygen in the reaction system was removed by introducing nitrogen gas while maintained at a temperature of 25° C. Thereafter, 34.0 g (purity content 65% by weight, 128.0 mmol) of m-chloroperbenzoic acid dissolved in 200 ml of dichloromethane was dropped thereto for 5 hours. Subsequently, the reaction liquid was maintained at a temperature of 25° C. for 6 hours, and then a white precipitate was removed from the reaction liquid by centrifugation. The remained upper layer was washed with 150 ml of a 10% by weight potassium carbonate solution and subsequently 150 ml of a saturated sodium chloride solution, respectively. Thereafter, an organic layer was dehydrated with an appropriate amount of magnesium sulfate, and then dried under reduced pressure after magnesium sulfate was removed, so that 16.2 g of a crosslinked methacrylic acid-type copolymer, which was a red powder, was obtained.

Example 8

Into a 500 ml four-neck flask provided with an agitator, a nitrogen-gas introducing tube, a thermometer, and a reflux condenser tube were put 70.0 g (311 mmol) of 2,2,6,6-tetramethyl-4-piperidinyl methacrylate, 0.92 g (3.1 mmol) of 1,9-nonanediol dimethacrylate, 2.10 g (6.2 mmol) of n-stearyl methacrylate, and 150 ml of dehydrated toluene to obtain a homogeneous solution. Subsequently, oxygen in the reaction system was removed by introducing nitrogen gas while maintained at a temperature of 0° C. Thereafter, 1.4 ml (2.2 mmol, 0.14 g as n-butyl lithium) of a commercially available n-butyl lithium hexane solution (1.5 mol/l) as a polymerization initiator was added thereto, and then the reaction was allowed to advance at a temperature of 0° C. for 6 hours under agitation. Then, methanol was added thereto to terminate the reaction. After the reaction was finished, the temperature of the reaction liquid was returned to room temperature, and then added to 2000 ml of hexane to be filtrated. The filtrated liquid was washed with 500 ml of hexane, and then dried under reduced pressure, so that 70.5 g of a polymerization reaction product, which was a white powder, was obtained (96.1% yield).

H-NMR of the obtained polymerization reaction product in a white powder state was measured to be found that peaks were observed at 5.06, 3.92, 1.87, 1.23, 1.21, 1.18, 0.94, and 0.74 ppm. The peak at 3.92 ppm among these was due to n-stearyl methacrylate.

Next, 10 g of the polymerization reaction product obtained, 0.73 g (2.2 mmol) of sodium tungstate dihydrate as a catalyst, and 300 ml of methanol were put into a 500 ml four-neck flask provided with an agitator, a nitrogen-gas introducing tube, a thermometer, a reflux condenser tube, and a dropping funnel, and then oxygen in the reaction system was removed by introducing nitrogen gas while maintained at a temperature of 25° C. Thereafter, 50.40 g (445 mmol) of a 30% hydrogen peroxide solution was dropped thereto for 3 hours. Subsequently, the reaction liquid was maintained at a temperature of 25° C. for 8 hours, and then the reaction liquid was filtrated. The filtrated liquid was washed with 500 ml of methanol and subsequently 500 ml of water, respectively, and then dried under reduced pressure, so that 9.5 g of a crosslinked methacrylic acid-type copolymer, which was a red powder, was obtained.

Comparative Example 1

The same procedures as those in Example 1 were carried out except for not using 0.34 g (1.0 mmol) of n-stearyl methacrylate, so that 21.1 g of a polymerization reaction product, which was a white powder, was obtained (92.5% yield).

H-NMR of the obtained polymerization reaction product in a white powder state was measured to be found that peaks were observed at 5.06, 1.88, 1.25, 1.21, 1.16, 0.94, and 0.73 ppm. The peak at 3.92 ppm observed in Example 1 was not observed.

Next, the same procedures as those in Example 1 were carried out on the polymerization reaction product obtained, so that 9.2 g of a red powder was obtained.

Comparative Example 2

The same procedures as those in Example 2 were carried out except for not using 0.34 g (1.0 mmol) of n-stearyl methacrylate, so that 21.8 g of a polymerization reaction product, which was a white powder, was obtained (95.6% yield).

H-NMR of the obtained polymerization reaction product in a white powder state was measured to be found that peaks were observed at 5.07, 1.87, 1.23, 1.20, 1.16, 0.93, and 0.72 ppm. The peak at 3.92 ppm observed in Example 2 was not observed.

Next, the same procedures as those in Example 2 were carried out on the polymerization reaction product obtained, so that 9.5 g of a red powder was obtained.

Comparative Example 3

The same procedures as those in Example 1 were carried out except for not using 0.30 g (1.0 mmol) of 1,9-nonanediol dimethacrylate, so that 9.7 g of a red powder was obtained.

Comparative Example 4

The same procedures as those in Example 2 were carried out except for not using 0.30 g (1.0 mmol) of 1,9-nonanediol dimethacrylate, so that 9.5 g of a red powder was obtained.
Evaluation of Crosslinked (Meth)Acrylic Acid-Type Copolymer and Red Powder With respect to each of the crosslinked methacrylic acid-type copolymers obtained in Examples 1 to 8 and each of the red powders obtained in Comparative Examples 1 to 4, solubility to each solvents of propylene carbonate, diethyl carbonate, and a mixed solvent of ethylene carbonate/diethyl carbonate (weight ratio: 3/7) were evaluated. Each of the products was mixed with each of the solvents so that the concentration of the powder became 10% by weight. Each of the mixtures was agitated at room temperature for 24 hours and then filtrated to obtain a filtrated liquid. Each of the filtrated liquid was dried under a reduced pressure of 10 mmHg at a temperature of 150° C. for 15 hours, so that a crude dissolved portion was obtained. Each of the crude dissolved portions was washed with purified water, and then dried under a reduced pressure of 10 mmHg at a temperature of 150° C. for 3 hours, so that a dissolved portion was obtained and solubility was calculated. Table 1 shows the results thereof.

The results shown in Table 1 indicates that each of the crosslinked (meth)acrylic acid-type copolymers obtained in Examples 1 to 8 and each of the red powders obtained in Comparative Examples 1 and 2 have solubility less than 1% to all the solvents used in the evaluation, so that it is found that stability to a solvent is excellent.

On the other hand, the red powder obtained in each of Comparative Examples 3 and 4 has exceedingly high solubility to all the solvents used in the evaluation, so that it is found that stability to a solvent is poor.

The crosslinked methacrylic acid-type copolymer obtained in Example 1 was mixed with each of the solvents used in the above evaluation so that the concentration of the copolymer in the respective solvent became 10% by weight, and then stored at a temperature of 40° C. under agitation. After a predetermined time period passed, the reaction liquid was filtrated and the thus-obtained filtrated liquid was dried under a reduced pressure of 10 mmHg at a temperature of 150° C. for 15 hours, so that a crude dissolved portion was obtained. This crude dissolved portion was washed with purified water, and then dried under a reduced pressure of 10 mmHg at a temperature of 150° C. for 3 hours, so that a dissolved portion was obtained and solubility was calculated. Table 2 shows the result.

TABLE 2

| | Solubility (%) | | |
|---|---|---|---|
| | Time period of storage 10 days | Time period of storage 20 days | Time period of storage 50 days |
| Propylene carbonate | <1 | <1 | <1 |
| Diethyl carbonate | <1 | <1 | <1 |
| Mixed solvent of ethylene carbonate/ diethyl carbonate | <1 | <1 | <1 |

The result shown in Table 2 indicates that the crosslinked methacrylic acid-type copolymer obtained in Example 1 retains solubility less than 1% to all the solvents used in the evaluation over a time period of storage of 50 days, so that it is found that stability to a solvent is excellent over a long period of time.

TABLE 1

| | Composition (mmol) | | | | | Solubility (%) | | |
|---|---|---|---|---|---|---|---|---|
| | 2,2,6,6-Tetramethyl-4-piperidinyl methacrylate | 1,9-Nonanediol dimethacrylate | 1,9-Nonanediol diacrylate | Ethylene glycol dimethacrylate | n-Stearyl methacrylate | Propylene carbonate | Diethyl carbonate | Mixed solvent of ethylene carbonate/ diethyl carbonate |
| Example 1 | 100 | 1.0 | — | — | 1.0 | <1 | <1 | <1 |
| Example 2 | 100 | 1.0 | — | — | 1.0 | <1 | <1 | <1 |
| Example 3 | 100 | 11.1 | — | — | 1.0 | <1 | <1 | <1 |
| Example 4 | 100 | — | 1.0 | — | 1.0 | <1 | <1 | <1 |
| Example 5 | 100 | — | — | 1.0 | 1.0 | <1 | <1 | <1 |
| Example 6 | 100 | 1.0 | — | — | 0.1 | <1 | <1 | <1 |
| Example 7 | 311 | 3.1 | — | — | 6.2 | <1 | <1 | <1 |
| Example 8 | 311 | 3.1 | — | — | 6.2 | <1 | <1 | <1 |
| Comparative Example 1 | 100 | 1.0 | — | — | — | <1 | <1 | <1 |
| Comparative Example 2 | 100 | 1.0 | — | — | — | <1 | <1 | <1 |
| Comparative Example 3 | 100 | — | — | — | 1.0 | 99 | 98 | 99 |
| Comparative Example 4 | 100 | — | — | — | 1.0 | 99 | 98 | 99 |

Example 9

Production of Lithium Ion Secondary-Cell Electrode

The crosslinked methacrylic acid-type copolymer obtained in Example 1 was pulverized with an agate mortar to be 100 μm or less in a particle diameter. An amount of 0.5 g thereof, 10 g of N-methylpyrrolidone as a solvent, 0.1 g of polyvinylidene fluoride as a binder, and 0.4 g of a graphite powder as an auxiliary conductive material were mixed and agitated to obtain a black-colored slurry. An amount of 2 g of this slurry was dropped onto the surface of an aluminum foil (area: 1.5 cm×1.5 cm, thickness: 100 μm) provided with a lead, and then spread with a wire bar so that the thickness became wholly even. Subsequently, the slurry was dried under reduced pressure at a temperature of 120° C. for 6 hours, thereby obtaining an electrode in which the crosslinked methacrylic acid-type copolymer obtained in Example 1 was bound to a current collector. When the copolymer-applied surface of the current collector was visually observed, no crack was found. With respect to the coating film formed by the crosslinked methacrylic acid-type copolymer, the film thickness was measured by a thickness measurement apparatus (MORITEX Corporation, MHF-D100LR) to be 140 μm.

Example 10

The same procedures as those in Example 9 were carried out except for using the crosslinked methacrylic acid-type copolymer obtained in Example 2 instead of that obtained in Example 1, so that an electrode was produced. No crack was found on the copolymer-applied surface of the current collector. The film thickness was measured in the same manner as in Example 9 to be 150 μm.

Example 11

The same procedures as those in Example 9 were carried out except for using the crosslinked methacrylic acid-type copolymer obtained in Example 3 instead of that obtained in Example 1, so that an electrode was produced. No crack was found on the copolymer-applied surface of the current collector. The film thickness was measured in the same manner as in Example 9 to be 140 μm.

Example 12

The same procedures as those in Example 9 were carried out except for using the crosslinked methacrylic acid-type copolymer obtained in Example 4 instead of that obtained in Example 1, so that an electrode was produced. No crack was found on the copolymer-applied surface of the current collector. The film thickness was measured in the same manner as in Example 9 to be 140 μm.

Example 13

The same procedures as those in Example 9 were carried out except for using the crosslinked methacrylic acid-type copolymer obtained in Example 5 instead of that obtained in Example 1, so that an electrode was produced. No crack was found on the copolymer-applied surface of the current collector. The film thickness was measured in the same manner as in Example 9 to be 140 μm.

Example 14

The same procedures as those in Example 9 were carried out except for using the crosslinked methacrylic acid-type copolymer obtained in Example 6 instead of that obtained in Example 1, so that an electrode was produced. No crack was found on the copolymer-applied surface of the current collector. The film thickness was measured in the same manner as in Example 9 to be 150 μm.

Example 15

The same procedures as those in Example 9 were carried out except for using the crosslinked methacrylic acid-type copolymer obtained in Example 7 instead of that obtained in Example 1, so that an electrode was produced. No crack was found on the copolymer-applied surface of the current collector. The film thickness was measured in the same manner as in Example 9 to be 140 μm.

Example 16

The same procedures as those in Example 9 were carried out except for using the crosslinked methacrylic acid-type copolymer obtained in Example 8 instead of that obtained in Example 1, so that an electrode was produced. No crack was found on the copolymer-applied surface of the current collector. The film thickness was measured in the same manner as in Example 9 to be 140 μm.

Comparative Example 5

The same procedures as those in Example 9 were carried out except for using the red powder obtained in Comparative Example 1 instead of the crosslinked methacrylic acid-type copolymer obtained in Example 1, so that an electrode was produced. For obtaining the slurry having the same coating property as that in Example 9, it was required to increase the amount of N-methylpyrrolidone used as the solvent to 12 g. The amount used of N-methyl pyrrolidone was increased to 12 g and the slurry was dried under reduced pressure at a temperature of 120° C. for 6 hours. Thereafter, the copolymer-applied surface of the current collector was visually observed, and cracks were partially found. The film thickness was measured in the same manner as in Example 9 to be 150 μm.

Comparative Example 6

The same procedures as those in Example 9 were carried out except for using the red powder obtained in Comparative Example 2 instead of the crosslinked methacrylic acid-type copolymer obtained in Example 1, so that an electrode was produced. For obtaining the slurry having the same coating property as that in Example 9, it was required to increase the amount of N-methylpyrrolidone used as the solvent to 15 g. The amount used of N-methyl pyrrolidone was increased to 15 g and the slurry was dried under reduced pressure at a temperature of 120° C. for 6 hours. Thereafter, the copolymer-applied surface of the current collector was visually observed, and cracks were partially found. The film thickness was measured in the same manner as in Example 9 to be 140 μm.

TABLE 3

|  | Electrode material | Amount used of N-methylpyrrolidone (g) | Film thickness (μm) | Crack |
|---|---|---|---|---|
| Example 9 | Crosslinked methacrylic acid-type copolymer (Example 1) | 10 | 140 | None |
| Example 10 | Crosslinked methacrylic acid-type copolymer (Example 2) | 10 | 150 | None |
| Example 11 | Crosslinked methacrylic acid-type copolymer (Example 3) | 10 | 140 | None |
| Example 12 | Crosslinked methacrylic acid-type copolymer (Example 4) | 10 | 140 | None |
| Example 13 | Crosslinked methacrylic acid-type copolymer (Example 5) | 10 | 140 | None |
| Example 14 | Crosslinked methacrylic acid-type copolymer (Example 6) | 10 | 150 | None |
| Example 15 | Crosslinked methacrylic acid-type copolymer (Example 7) | 10 | 140 | None |
| Example 16 | Crosslinked methacrylic acid-type copolymer (Example 8) | 10 | 140 | None |
| Comparative Example 5 | Red powder (Comparative Example 1) | 12 | 150 | Present |
| Comparative Example 6 | Red powder (Comparative Example 2) | 15 | 140 | Present |

INDUSTRIAL APPLICABILITY

The present invention can provide an electrode material useful for a secondary cell high in energy density and in capacity, and an electrode using the material.

The invention claimed is:

1. A crosslinked (meth)acrylic acid-type copolymer obtained by the steps of:
   polymerization of a (meth)acrylic acid imino compound represented by the general formula (1):

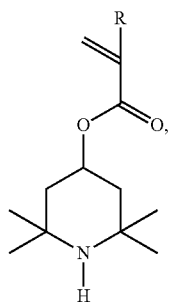

(1)

wherein in the formula (1), R represents a hydrogen atom or a methyl group, and a (meth)acrylic acid ester in the presence of a crosslinking agent, and
   nitroxidation,
   wherein said (meth)acrylic acid ester is at least one ester selected from the group consisting of hexyl (meth)acrylate, octyl (meth)acrylate, decyl (meth)acrylate, lauryl (meth)acrylate, stearyl (meth)acrylate, and behenyl (meth)acrylate.

2. The crosslinked (meth)acrylic acid-type copolymer according to claim 1,
   wherein an amount of said (meth)acrylic acid ester contained in the polymerization step is 0.00001 to 0.25 mol relative to 1 mol of said (meth)acrylic acid imino compound.

3. The crosslinked (meth)acrylic acid-type copolymer according to claim 1,
   wherein said crosslinking agent is at least one material selected from the group consisting of ethylene glycol di(meth)acrylate, 1,4-butanediol di(meth)acrylate, 1,6-hexanediol di(meth)acrylate, 1,8-octanediol di(meth)acrylate, and 1,9-nonanediol di(meth)acrylate.

4. The crosslinked (meth)acrylic acid-type copolymer according to claim 1,
   wherein a method for said polymerization is a suspension polymerization method.

5. The crosslinked (meth)acrylic acid-type copolymer according to claim 1,
   wherein a method for said polymerization is an emulsion polymerization method.

6. A secondary-cell electrode, which contains said crosslinked (meth)acrylic acid-type copolymer according to claim 1.

7. The crosslinked (meth)acrylic acid-type copolymer according to claim 1,
   wherein an amount of said crosslinking agent contained in the polymerization step is 0.00001 to 0.25 mol relative to 1 mol of said (meth)acrylic acid imino compound.

8. The crosslinked (meth)acrylic acid-type copolymer according to claim 1, which is used for a secondary-cell electrode.

* * * * *